Feb. 12, 1952 O. A. JOHNSON 2,585,013
PRIZING TOOL
Filed April 5, 1950 2 SHEETS—SHEET 1
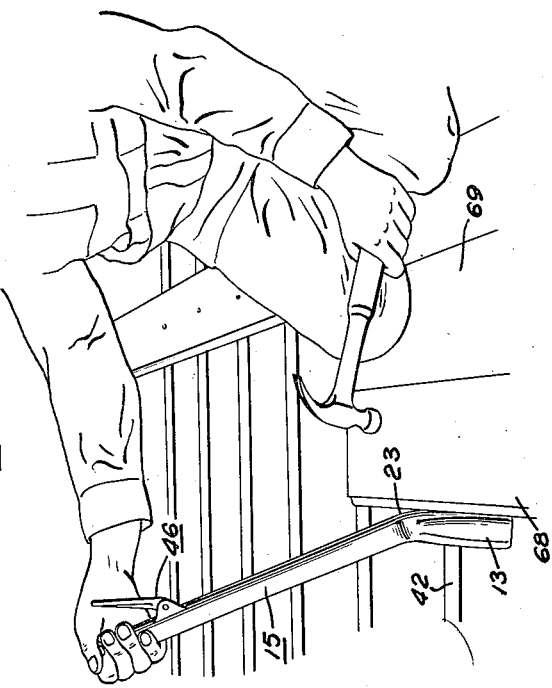
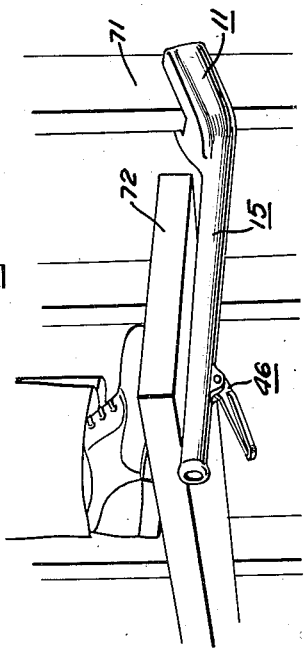
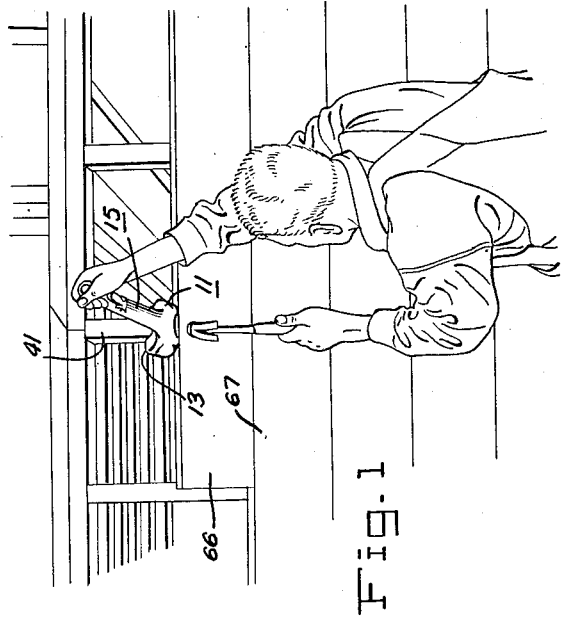
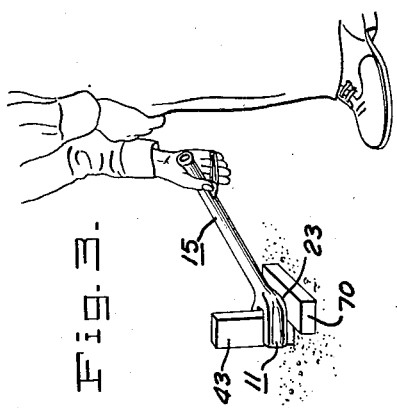
INVENTOR.
Oscar A. Johnson
BY *Lancaster, Allen & Hommel*
ATTORNEYS.

Feb. 12, 1952     O. A. JOHNSON     2,585,013
PRIZING TOOL
Filed April 5, 1950     2 SHEETS—SHEET 2
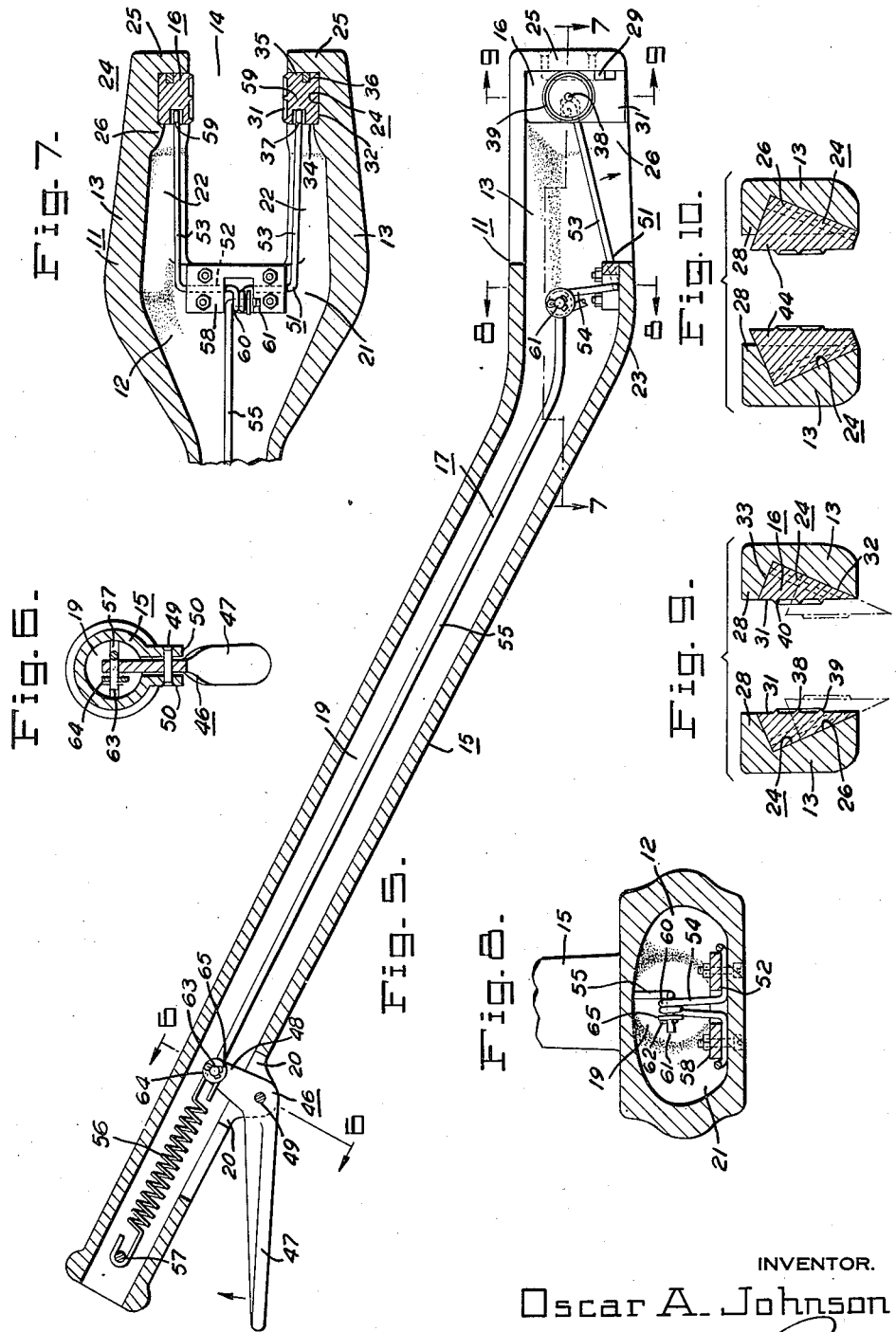
INVENTOR.
Oscar A. Johnson
BY
ATTORNEYS.

Patented Feb. 12, 1952

2,585,013

UNITED STATES PATENT OFFICE 2,585,013

PRIZING TOOL

Oscar A. Johnson, Pullman, Wash.

Application April 5, 1950, Serial No. 154,017

7 Claims. (Cl. 254—17)

This invention relates to tools primarily intended for use by carpenters and other workmen in pressing, forcing and moving material, especially wood, into place prior to securing it to some adjacent part in the construction or repair of buildings, ships, docks, vehicles, such as rolling stock, forms for cementitious material and the like. The tools may, however be put to other uses, such as for extracting stakes from the ground, for the support of scaffold decking or as temporary supports on which supplies, tools, and equipment may be hung or as temporary handles for moving objects, such as sections of forms, from place to place.

The principal objects of the invention are to provide tools of this character which are low in cost of manufacture, sturdy, easily operated and susceptible of easy removal and replacement of parts subjected to wear or particularly useful to meet the requirements of certain specific jobs to be performed.

Other objects and advantages will appear in the following detailed description of the preferred embodiments of my invention, taken in connection with the accompanying drawings, forming a part of this specification, and in which drawings:

Figs. 1, 2, 3 and 4 are perspective views showing the tool in use for accomplishing various objects.

Fig. 5 is a longitudinal, vertical sectional view through the tool.

Figs. 6, 7, 8 and 9 are sectional views on substantially the lines 6—6, 7—7, 8—8 and 9—9, respectively, of Fig. 5.

Fig. 10 is a sectional view similar to Fig. 9, but showing different sizes of jaws forming a part of the tool, than are shown in Figs. 5, 7 and 9.

The tool comprises, in general, a U-shaped head 11, comprising a bight portion 12 and substantially parallel spaced apart arms 13 providing a slot 14 into which the work may extend, as shown in Figs. 1-4 inclusive; a main handle bar 15 rigid with and extending from the bight portion 12 in a direction opposite to the arms 13 and preferably with its axis in acute angular relation to the plane common to the arms 13; a pair of wedge-shaped jaw members 16 carried by the arms 13 and movable in the slot 14 toward and from each other, or, in other words, from open to work gripping positions; and means 17 for operating the jaws.

It is preferred to mold the handle bar 15 integral with the head 11 and to provide the former with a longitudinally extending way 19 and a transversally extending way 20 communicating therewith adjacent the free end portion of the handle bar, and provide the head 11 with communicating recesses 21 and 22 at the inner faces of the bight portion 12 and arms 13, respectively, with the way 20 of the handle bar in communication with the recess 21 as shown in Figs. 5, 7 and 8, the ways 19 and 20 and the recesses 21 and 22 being for accommodation of parts of the means 17.

It is also preferred to round the face or surface of the tool at the juncture between the handle bar 15 and head, at the outer angle between the two, as indicated at 23 in Fig. 5, so that in certain operations the workman may locate the prizing tool in engagement with a rigid piece of the work so that this rounded face is in engagement with a movable piece of the work, as shown in Fig. 1, so that in operating the tool it is less likely to bruise or mutilate the piece being forced into place.

The arms 13 at the confronting face of the free end portions are provided with transverse guideways 24 in diverging relation as shown in Figs. 9 and 10. Each guideway may be provided by forming a cross flange 25 at the extreme end of its respective arm, a transverse rib 26 paralleling and spaced from the flange 26, the flange and rib forming side guides for the associated jaw member 16, an inclined pressure receiving slide face 27 for engagement with the inclined face of the companion jaw, and a stop or abutment wall 28 extending across the deep end of the guideway, joining the flange 25 and rib 26. It is also preferred to secure to the inside face of cross flange 25 an elongated key 29 paralleling the plane of the face 27. This key may be molded as a part of the arm or may be a separate strip of metal secured in place by lugs or the like.

Referring now to the jaw members 16, they may be made of any suitable material such as steel, bronze, or a metal alloy, and in the example shown are generally of wedge shape providing a work engaging face 31, a slide face 32 in angular relation thereto for engagement with the pressure receiving slide face 27, a stop end face 33 at the larger end of the member for engagement with the abutment wall 28, and side faces 34 and 35, the latter of which is provided with a groove 36 paralleling the slide face 32, this groove to receive in guiding relation, the key 29. In the example shown each jaw member 16 in provided with a recess 37 open at side face 34 for detachably receiving a portion of the means 17, as hereinafter described. The work engaging face 31 is provided with anti-skid projections of any suitable character, in the example shown, consisting of a pointed lug 38 and an annular rib 39 concentric therewith, the rib preferably having a sharp edge 40 adapted to penetrate the work when the jaws are forced toward each other with the work therebetween. This arrangement of lug and rib on each jaw provides pivots for the tool which is swung from one position to another while gripping the work, either a stationary member, such as a stud 41 as shown in Fig. 1, a joist 42 as shown in Fig. 2, or a movable member, such as a stake 43 as shown in Fig. 3.

By way of example, the tool may be made so that the width of slot 14 is such as to freely receive a stud or joist of undressed lumber two inches thick, when the jaw members are retracted or in open position, such as with the stop end faces 33 in engagement with the abutment walls 28 as shown in Fig. 9. A different thicker set of jaw members 44 shown in Fig. 10 may be provided, to be substituted for those shown in Fig. 9, when the tool is used in connection with relatively thin pieces of work, such as dressed lumber so thin that the amplitude of movement of the jaw members, as shown by dot and dash lines in Fig. 9, would not provide a firm grip thereon.

The means 17 preferably comprises a bell crank hand lever 46 comprising a relatively long arm 47 shaped for convenient grasping by the operator, and a relatively short arm 48 extending through the way 20 and into the way 19 of the bar 15, the lever 46 being pivoted to the bar by a pin 49 extending through companion ears 50 at each side of the way 20; a substantially U-shaped actuating member 51 comprising a bight portion 52, spring arms 53 and a lever arm 54 extending normal to the plane of the arms 53; a link 55 connecting the lever arm 54 and the short arm 48; and a contraction spring 56 operatively connected to the arm 48 at one end and secured at its other end to the handle bar 15 as by cross pin 57 the spring 56 acting to spring bias the jaws 16 to an open position. Also in the example shown, the bight portion 52 of member 51 is pivotally connected to the bight portion 12 of head 11 by a bearing block 58 detachably connected to portion 12, by bolts. The actuating member 51 may be formed from a single strand of spring wire, such as spring steel or Phosphor bronze and in the example shown has the free ends of the arms 53 looped as indicated at 59 to form rounded bearings where they engage in the recesses 37. The lever arm 54 may be formed from an intermediate portion of the strand bent to form a loop 60 acting as a pivot for a laterally projecting terminal portion 61 of link 55, as shown in Figs. 5, 7 and 8. A cotter pin 62 extending through the portion 61 is provided to keep the link from accidental disengagement with the loop 60. The other end of the link 55 may be provided with a laterally extending portion 63 extending through an opening in the free end of short arm 48 as shown in Fig. 6 and kept in place by a cotter pin 64 extending through portion 63. The latter may also serve as a means for connecting the end of spring 56 opposite pin 57, to the hand lever 46. If desired, washers 65 may be provided on the portions 61 and 63 between the respective cotter pins thereof and the movable parts of this motion transmitting means.

It will be noted that the bight and arm portions of the actuating member 51 are accommodated in the recesses 21 and 22, respectively, where they are out of the way of material disposed in slot 14 during use of the tool, and that the link 55 and spring 56 are disposed in the longitudinally extending way 20 of the handle bar 15 where they also are protected against injury even though they may be carelessly handled or mingled with other tools during storage and transportation.

The tool, as hereinbefore stated, has many uses.

As shown in Fig. 1, it may be used to engage an upright, such as stud 41 and act as a lever for forcing a piece of subsiding 66 or other structural member into intimate contact with subjacent structural members 67 already secured in place, so as to facilitate nailing or otherwise securing the piece 66 in place.

In Fig. 2, the tool is shown in use engaging a joist 42, and acting as a lever to force a piece of sub-flooring 68 into intimate contact with a piece 69 of such material already secured in place.

By reference to Fig. 3 it will be noted that the tool may be used to extract a stake 43 from the ground by gripping the stake and acting upon a block 70 resting on the ground.

In the foregoing instances of uses of the tool, it will be noted that the rounded surface 23, previously described as adapted to engage the work, is not likely to bruise or mutilate the part engaged thereby.

The tool may be clamped in place to act as a support in which connection it is shown in Fig. 4 as engaging an upright 71 of a structure in clamping relation therewith, the handle bar 15 sustaining a scaffold deck member 72.

There are many other uses for the tool which will be apparent to workman. For instance it may be used in gripping relation with a portion of a form of cementitious material, not shown in the drawing, to assist workman in conveniently moving the form from place to place. It may also be used to twist warped lumber, such as studs, joists, etc. into line for nailing members thereto by embracing the warped piece between the arms 13 and applying a lateral force to the lever bar 15, apparent from an inspection of Figs. 1 and 2.

The jaws 16 may be readily removed for sharpening of the lugs 38 and ribs 39 or the replacement by drawing the long arm 47 of hand lever 46 toward the free end of handle bar 15, which moves the jaws 16 to the position shown by dot and dash lines in Fig. 9, and thereafter grasping the portions of the jaws extending beyond the arms 13 and canting with jaws out of guided relation to the flange 25 and rib 26. The spring arms 53 yield to permit this and the withdrawal of their free end from their respective recesses 37. Replacing of jaws may be accomplished by a reverse procedure.

When the tool is used as a lever or as a support, it will be noted that pressure applied to the handle bar, after the jaws have been brought into engagement with the work by manipulation of the hand lever 46, and with the bight portion 12 or the curved surface 23 engaging the work, will cause the jaws to grip the work more firmly by riding upon the guideways 24.

It will also be noted that the tool is devoid of any so-called pivotal "board block," "pressure plate," "pawl" or "tongue" quite commonly forming a part of a flooring and siding tool which somewhat limit use of tools of this character to those specific uses shown in Figs. 1 and 2.

The tool may, of course, be made on a scale large enough to cooperate with and act upon larger structural members, and the like, such as planks, posts, etc. without departing from the spirit of this invention.

What is claimed is:

1. In a prizing tool, the combination of a U-shaped head comprising a bight portion and spaced apart arms rigid with and extending from said bight portion providing a slot into which the work may extend, a main handle bar rigid with and extending from said bight portion in a direction opposite to said arms, a pair of facing jaw members movably carried by said arms at their confronting faces in a manner to be movable toward and retractable from each other, means carried by said head and operatively connected to said jaw members to move them toward and from each other, a hand lever carried by said main handle bar at its free end portion, and motion transmitting means operatively connecting said hand lever and to said means for actuating the same.

2. In a prizing tool, the combination of a U-shaped head comprising a bight portion and spaced apart arms rigid with and extending from said bight portion providing a slot into which the work may extend, a main handle bar rigid with and extending from said bight portion in a direction opposite to said arms, said bar disposed with its axis in obtuse angular relation to the plane common to said arms, a pair of facing jaw members movably carried by siad arms at their confronting faces in a manner to be movable toward and retractable from each other, means carried by said head and operatively connected to said jaw members to move them toward and from each other, a hand lever carried by said main handle bar at its free end portion, and motion transmitting means operatively connecting said hand lever and to said means for actuating the same.

3. In a prizing tool, the combination of a U-shaped head comprising a bight portion and spaced apart arms rigid with and extending from said bight portion providing a slot into which the work may extend, said arms at their confronting faces, provided with transverse guideways in diverging relation, a main handle bar rigid with and extending from said bight portion in a direction opposite to said arms, a pair of wedge shaped jaw members slidably carried by said arms in engagement with said guideways, for movement from open to work gripping positions, and means operatively connected with said jaws to move them along said guideways and including a hand operated device at the free end portion of said main handle bar.

4. In a prizing tool, the combination of a U-shaped head comprising a bight portion and spaced apart arms rigid with and extending from said bight portion providing a slot into which the work may extend, a main handle bar rigid with and extending from said bight portion in a direction opposite to said arms, said handle bar disposed with its axis in obtuse angular relation to the plane common to said arms, and the surface of said bight portion and bar at the juncture of the two being rounded in the direction of the length of the tool to provide a curved surface for engaging the work, and a pair of facing jaws carried by said arms at their confronting faces and movable toward and from each other.

5. In a prizing tool, the combination of a U-shaped head comprising a bight portion and spaced apart arms rigid with and extending from said bight portion providing a slot into which the work may extend, said bight portion and arms provided with communicating recesses at their inner faces, and said arms at their confronting faces provided with transverse guideways in diverging relation, a main handle bar rigid with and extending from said bight portion in a direction opposite to said arms, said bar provided with a longitudinally extending way open to the recess of said bight portion, a pair of wedge shaped jaw members slidable carried by said arms in engagement with said guideways, for movement from open to work gripping positions, a substantially U-shaped actuating member comprising a bight portion and spring arms extending from its bight portion, the bight portion and arms of said actuating member disposed in the recesses of said bight portion and arms, respectively of said head, said bight portion of the actuating member pivotally mounted in its respective recess of said head, and the free end portions of said arms of the actuating member operatively connected with said jaws for movement thereof along said guideways upon swinging movement of said actuating member, a hand lever carried by said main handle bar at its free end portion, and motion transmitting means extending in the longitudinally extending way of said main handle bar and in said recess of the bight portion of said head, operatively connected with said hand lever and actuating member for operating the latter by movement of the former.

6. In a prizing tool, the combination of a U-shaped head comprising a bight portion and spaced apart arms rigid with and extending from said bight portion providing a slot into which the work may extend, said bight portion and arms provided with communicating recesses at their inner faces, and said arms at their confronting faces provided with transverse guideways in diverging relation, a main handle bar rigid with and extending from said bight portion in a direction opposite to said arms, said bar provided with a longitudinally extending way open to the recess of said bight portion, a pair of wedge shaped jaw members slidably carried by said arms in engagement with said guideways, for movement from the work gripping positions, a substantially U-shaped actuating member comprising a bight portion and spring arms extending from its bight portion, the bight portion and arms of said actuating member disposed in the recesses of said bight portion and arms, respectively of said head, said bight portion of the actuating member pivotally mounted in its respective recess of said head, and the free end portions of said arms of the actuating member operatively connected with said jaws for movement thereof along said guideways upon swinging movement of said actuating member, a hand lever carried by said main handle bar at its free end portion, motion transmitting means extending in the longitudinally extending way of said main handle bar and in said recess of the bight portion of said head, operatively connected with said hand lever and actuating member for operating the latter by movement of the former, and a spring in said longitudinal way of the main handle bar, operatively connected to said motion transmitting means to normally spring bias said jaws to open position.

7. In a prizing tool, the combination of a U-shaped head comprising a bight portion and spaced apart arms rigid with and extending from said bight portion providing a slot into which the work may extend, said arms at their confronting faces, provided with transverse guideways in diverging relation, a main handle bar rigid with and extending from said bight portion in a direction opposite to said arms, a pair of wedge shaped jaw members slidably carried by said arms in engagement with said guideways, for movement from open to work gripping positions, said jaws provided with recesses open at their sides facing said bight portion, and means for moving said jaws along said guideways including a substantially U-shaped member pivotally carried by the bight portion of said head and spring arms, the free ends of which detachably engage the jaws in said recesses thereof.

OSCAR A. JOHNSON.

REFERENCES CITED

The following references are of record in the file of this patent:

UNITED STATES PATENTS

| Number | Name | Date |
| --- | --- | --- |
| 164,754 | Moss | June 22, 1875 |
| 780,054 | McDaniel | Jan. 17, 1905 |
| 1,005,038 | Hubbard | Oct. 3, 1911 |
| 1,582,837 | Long | Apr. 27, 1926 |
| 1,911,705 | McMullan | May 30, 1933 |
| 2,351,691 | Mansir | June 20, 1944 |